April 18, 1950     O. B. JACOBS     2,504,692
REPEATERED ELECTRICAL TRANSMISSION SYSTEM,
INCLUDING AUXILIARY CABLE SYSTEM

Filed July 31, 1946     4 Sheets-Sheet 1

INVENTOR
O. B. JACOBS
BY
N. S. Ewing
ATTORNEY

April 18, 1950

O. B. JACOBS 2,504,692

REPEATERED ELECTRICAL TRANSMISSION SYSTEM,
INCLUDING AUXILIARY CABLE SYSTEM

Filed July 31, 1946

INVENTOR
O. B. JACOBS
BY
N. D. Ewing
ATTORNEY

Patented Apr. 18, 1950

2,504,692

UNITED STATES PATENT OFFICE 2,504,692

REPEATERED ELECTRICAL TRANSMISSION SYSTEM, INCLUDING AUXILIARY CABLE SYSTEM

Oliver B. Jacobs, Morristown, N. J., assignor to Bell Telephone Laboratories, Incorporated, New York, N. Y., a corporation of New York Application July 31, 1946, Serial No. 687,428

17 Claims. (Cl. 179—170)

This invention relates in general to electrical transmission systems. More particularly, it relates to submarine cable systems including repeaters.

In extended repeatered submarine cable systems for the electrical transmission of telephone and telegraph signals, certain difficulties arise not encountered in the design and operation of shorter cable systems, in that the distances between points to be connected are so great that direct links would require excessively high voltages for supplying power. Moreover, the use of intermediate available landfalls for power stations has heretofore been considered impracticable under conditions where the hazard of cable damage and prolonged interruptions to service are great.

The problem therefore arises in a long repeatered system of supplying direct-current power to the repeaters over the cable without the use of potentials high enough to impair the service life or transmission performance of the system. Certain condensers in the repeaters nearest the shore stations are the elements chiefly concerned, since these are subjected to nearly the total potential of the power source, and their service life varies inversely as approximately the fifth power of the applied voltage. Other factors which make it desirable to restrict the applied potential are (1) possible weak spots in the cable insulation; (2) limited clearances between repeater wiring and the container; and (3) noise caused by corona discharges.

Moreover, the problem also arises of providing in such a system, continuous service in regions where damage may be caused by icebergs or by trawling operations, or where ice conditions would prevent the carrying out of repairs during portions of each year.

It is therefore a broad object of this invention to minimize the duration of interruptions to service resulting from faults in electrical transmission systems.

A more specific object of this invention is to enable the use of lower terminal voltages in the energizing circuits of extended repeatered submarine cable systems.

It is contemplated that the various features of this invention will be useful in electrical transmission systems of many different types; however, for the purposes of illustration, the invention is described herein as adapted to a repeatered submarine cable system.

In accordance with this invention, a main deep sea cable is connected to any one of two or more alternative branch cables extending through hazardous areas to a respective land station, by remote control. The invention contemplates the use of a system of relays at the connecting junction between main and branch cables which is so arranged that the proper connections are automatically made at such point whenever power for energizing the system is applied to or removed from any one of the branch cables.

A further feature of the invention includes means for normally supplying power for energizing repeaters at a point intermediate of the terminals of a main cable by way of a branch cable or alternative branch cables extending to one or more land based power supplies, without routing the main cable signal currents through the power supply station. In such a system remotely controlled connections permit either (1) normal operation using both the intermediate and terminal power supplies, or (2) operation whereby the system is energized entirely from the main cable terminal stations in case the branch cable or cables are faulty.

In accordance with certain specific embodiments of the invention, which are described later in detail, the interconnecting system comprises one or more relays disposed in a water-tight container located at the junction of a main cable with one or more power feeder cables or with two or more shore end cables, the relays being so connected that the application of power to any one of the alternative cables from the associated shore station will cause that cable to be connected to the main cable, and all other connections to be simultaneously locked out. In each case, the controlling relay has its winding in the path of the energizing current and remains operated as long as that current continues.

In case of a system employing a power feeder cable, the energizing current flows in opposite directions from the junction point in the main cable, and the polarity of the voltage applied to the feeder cable at the shore station is opposite to that applied to both of the terminal stations of the main cable. In the event that the power feeder cable becomes faulty and no alternative feeder cable has been provided, the cable system can be operated by means of increased potentials at the terminal stations which, though not considered satisfactory for permanent operation, would supply a reduced amount of energizing current sufficient to give a passable grade of service. Such type of operation is possible under two alternative conditions (1) if the repeaters between one of the terminals and the feeder junction point are equipped to operate with current flowing in either direction, or (2) if the relay circuits provide a solid ground connection when not operated. In the latter case the invention provides for the grounding of the main cable.

Other objects and features of this invention will be apparent from a study of the specification and the attached drawings, of which.

For the purposes of illustration, the present invention will be described as specifically adapted for use in an extended under-sea cable system for the transmission of speech and telegraph signals. However, it will be apparent that the principles of this invention may be applied to electrical transmission systems of many different types and constructions; and that the practice of this invention is not limited to use of the particular system or the particular apparatus and mechanical structures disclosed herein.

In a preferred form, the submarine cable system which is utilized in the several embodiments of the invention to be presently described, is broadly similar to the system disclosed in Patent 2,020,297 to O. E. Buckley et al., November 12, 1935. The cable sections, together with the interconnecting repeaters are armored in the conventional manner, such as described in Patent 2,352,158 to W. M. Bishop, June 27, 1944, and the related patents cited therein, the disclosures of which may be considered as incorporated herein. The repeaters, which are disposed at suitable intervals along the cable, have their energizing circuits connected in series with the cable, and may be constructed in accordance with my disclosure in Patent 2,342,544, February 22, 1944.

Figures 1A, 1B:
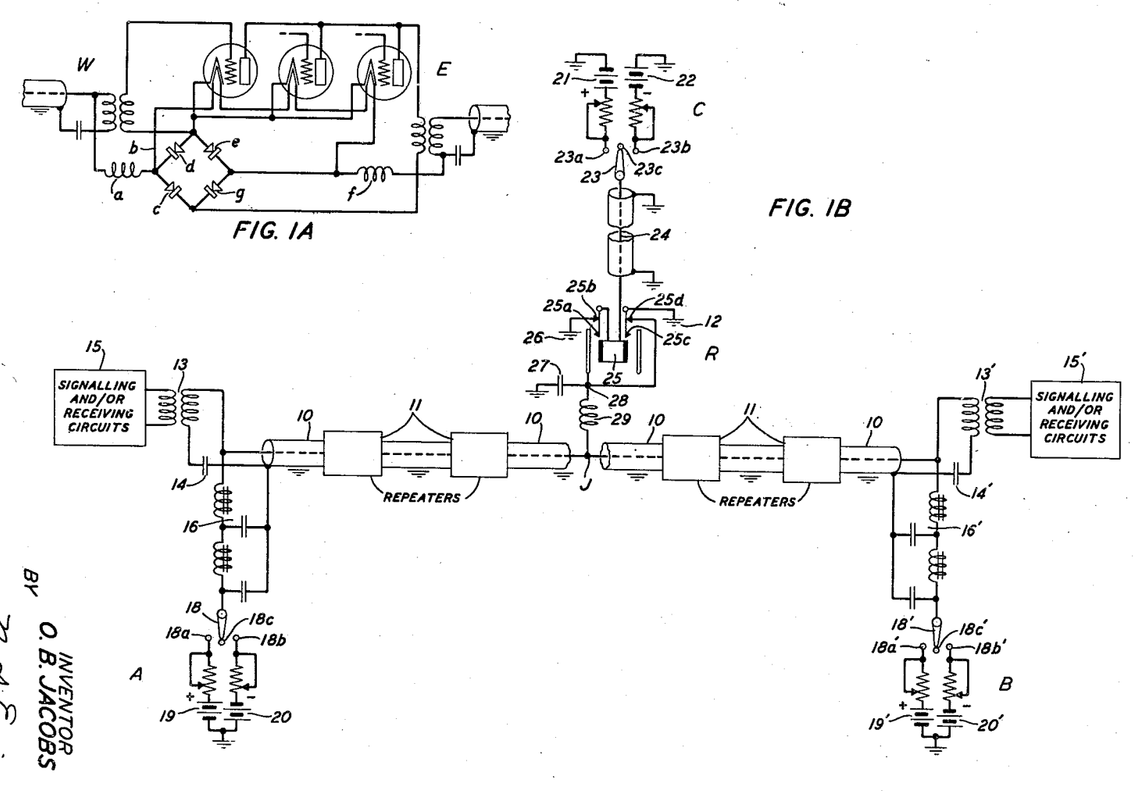
Fig. 1A shows a repeater circuit comprising a rectifying bridge to enable operation when supplied with energizing current in either direction along the cable.
Fig. 1B shows a submarine cable system including repeaters, which system comprises a main cable having terminal power sources, and an auxiliary power source and associated auxiliary cable connected at a junction intermediate of the terminals through a system of relays adapted to control the interconnection of the direct current paths of the main and auxiliary cables and the grounding of the direct current path of the main cable when the auxiliary system is not in use.

Inasmuch as in some of the presently described application of the invention it is required that the repeaters operate when supplied with energizing current flowing in either direction, the repeaters used in such cases include the rectifying bridge circuit shown in Fig. 1A. Referring to Fig. 1A, energizing current flowing in a W-E direction along the cable core flows into the repeater circuit through the inductance $a$, where it divides, part flowing into the repeater cathode heater circuits through the branch $b$ and into the inductance $f$, and part flowing into the plate circuits through the one-way valve $c$, from which it flows through the respective tubes to the cathode circuits, through the one-way valve $e$, and into the eastern cable section through the inductance $f$. Current flowing in an E-W direction along the cable core, flows into the repeater circuit through the inductance $f$, where it divides, part flowing into the heater circuit through branch $h$ and into the inductance $a$, and part flowing through the one-way valve $g$ into the plate circuits to the respective cathode circuits, and through the one-way valve $d$ into the western cable half through the inductance $a$. By means of this circuit, the repeater plates are always maintained at a positive potential with respect to the cathodes, regardless of the direction of current flow in the cable. Current flow in the heater circuits may be in either direction.

In accordance with one embodiment of my invention shown in Fig. 1B of the drawings, a submarine cable system comprising a main cable 10 with interconnected repeaters 11, extending from one terminal station A to a distant terminal station B, has a junction J intermediate of the terminals A and B whereat is disposed a relay R adapted to alternatively connect the main cable to the auxiliary energizing source at an intermediate station C or to the ground contact 12.

At each of the shore terminal stations A and B, circuits for the transmission and/or reception of speech and telegraph signals are connected to the respective cable terminals together with the circuits carrying direct current power for energizing the repeaters. The signal transmission and reception circuits, represented by the blocks 15 and 15' at A and B, respectively, may be of the types disclosed in Figs. 5 and 9 of the patent to O. E. Buckley et al., supra. The signal circuits 15 and 15' are connected to the primary windings of the respective transformers 13 and 13', the secondaries of which are connected through circuits which include the respective condensers 14 and 14' between the cable cores and the grounded outer conductors at the respective cable terminals.

At the terminal station A, direct current power to energize the repeaters 11 may be alternatively derived from the positive source 19 or the negative source 20, each of which may, for example, supply voltages of the order of 2,000 volts positive or negative in accordance with whether the switch 18 is positioned on contact 18a or 18b. When the switch 18 is connected to contact 18c power from the terminal station A is cut off completely. The switch 18 is connected through the filtering circuit 16 to the inner and outer cable terminals. As indicated by the primed numerals, the energizing circuit at station B is similar in structure and function to that of station A.

The station C, which may be disposed at an island base, houses an auxiliary direct current power supply for energizing the repeaters 11 through the junction J intermediate of the terminals A and B. Alternative positive and negative power sources, the batteries 21 and 22, are available to provide direct current potentials of the order of 1,000 volts positive or 1,000 volts negative in accordance with whether the switch 23 is connected through its *a* or *b* contact to the terminal of the auxiliary cable 24. The cable 24 is connected to the relay R and is preferably of similar construction to the main cable described hereinbefore.

If the junction J lies intermediate of the repeaters 11, as shown in Fig. 1B, it is preferably joined to the relay circuit R at contact point 28 through the inductance 29, which is designed to have a reactance of approximately 2,500 ohms at the lowest transmitted frequency in order to prevent material transmission loss from the main cable. A condenser-to-ground 27, having a capacitance of the order of one-half of a microfarad, provides a shunt-to-ground to prevent noise from the auxiliary power supply from interfering with the transmitted signals on the main cable. If the junction J lies at either end of the heater circuit in one of the repeaters 11, the condenser 27 may be omitted, and the inductance 29 need be only large enough to prevent too great a surge of current in case of a sudden fault on the cable 24.

The relay R comprising the operating winding 25 is a conventional neutral relay which is designed to operate in response to current strength considerably below that normally carried in the auxiliary power cable 24. Associated with the relay R are the left-hand make-before-break contacts 25*a* and 25*b*, and the symmetrically placed right-hand contacts 25*c* and 25*d*. When the relay winding 25 is deenergized, a current path is provided through the break-contact 25*b* to ground 26; similarly, the ground 12 is connected to the junction 28 through the break contact 25*d*. The contacts 12 and 26 are sea grounds, which ordinarily comprise short-circuit connections to the outer cable armor.

As long as the relay 25 remains deenergized, the ground 12 is connected to the junction 28, so that the energizing circuit for those repeaters 11 disposed on the western half of the cable extends from the station A to the junction J, and for the repeaters 11 on the eastern half, from station B to the junction J.

When power of the opposite polarity to that applied at the terminal stations A and B is applied from one of the direct current sources 21 or 22 of station C, the relay winding 25 is energized operating the right-hand break contact 25*d* to release the ground 12. The make-before-break combination 25*a*—25*b* is also operated to disconnect the ground 26 and provide a path for direct current power to flow from one of the sources 21 or 22 at C, through the auxiliary cable 24, the relay winding 25, the junction 28, and the inductance 29 to the junction J, where the circuit divides, permitting current flow in both directions therefrom along the main cable to the stations A and B.

Assume it is desired to utilize the auxiliary source at station C for energizing the repeaters 11. The operator at station C positions the switch on the contact 23*a*, first adjusting the associated rheostat, so that a positive voltage sufficient to supply a current of, for example 100 milliamperes, is impressed on the terminals of the cable 24. Simultaneously, the switches 18 and 18' at the respective terminal stations A and B are positioned so that negative potentials equivalent to the aforesaid positive potentials are impressed on the cable terminals at A and B, which are assumed to be approximately equidistant from the junction J. The relay R then operates to make the desired connection.

For optimum performance of the system, and in order to prevent current surges, equal and opposite potentials should be gradually and simultaneously built up at the auxiliary station C and at the terminal stations A and B in the manner prescribed in my Patent 2,020,316, November 12, 1935.

When current from the auxiliary source C ceases to flow through the relay circuit R, either through action of the operator or through operational failure, the auxiliary cable 24 is automatically connected to ground 26, and the main cable is again connected to ground 12.

By application of substantially larger direct current potentials at each of the cable terminals A and B, thereby enabling current to flow from the respective terminals to ground at J, or vice versa, depending on the polarity, the repeaters 11 may be energized, making the main cable operative while the auxiliary cable 24 is tested or repaired.

If it is desired to avoid having the main cable grounded when it is not energized, the ground 12 may be omitted, and the cable energized by voltages of opposite polarity applied at the respective main terminals, provided that the repeaters are equipped to operate when supplied with energizing current in either direction. Without the last-named feature, the ground connection must be retained in order to energize the main cable solely from its terminals. Obviously, if the repeaters are operable under only one direction of current flow, a given terminal would be equipped with a power supply of only one polarity.

Figure 2:
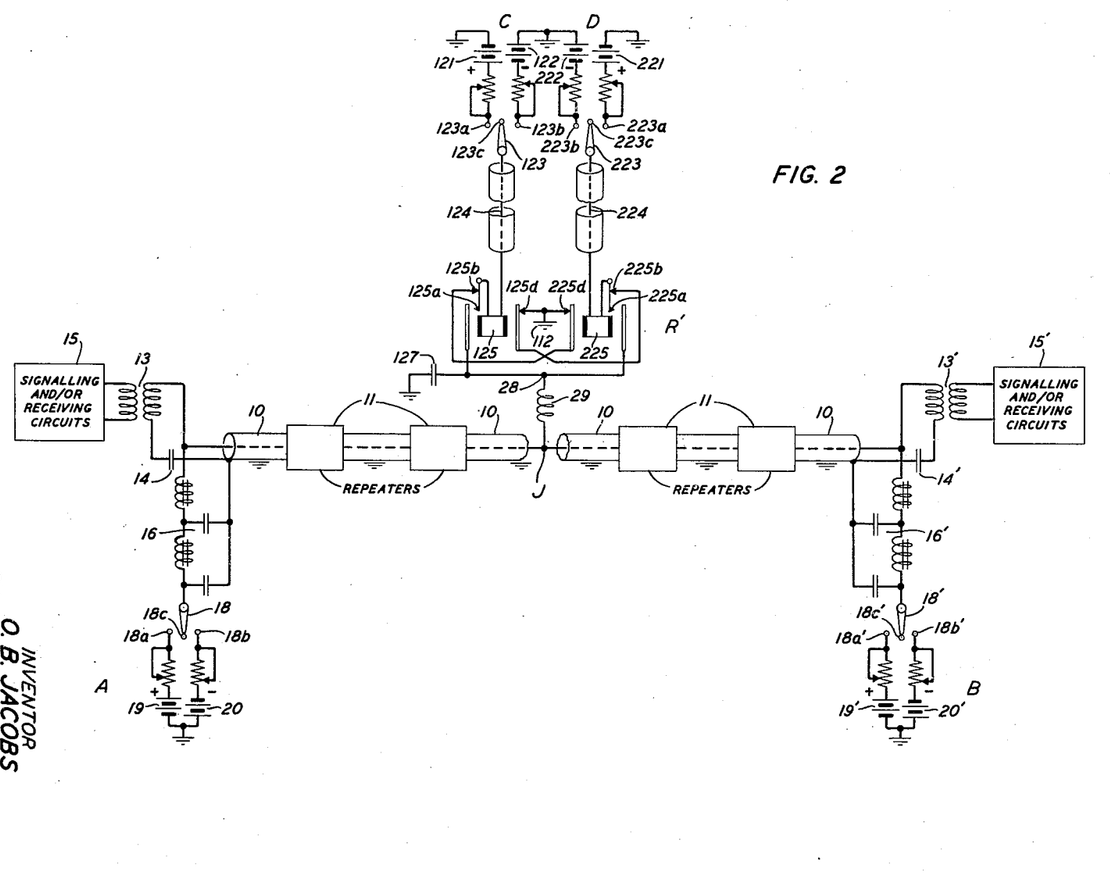
Fig. 2 shows a submarine cable system similar to that of Fig. 1B which has a pair of auxiliary power sources adapted to alternatively supply power to the main cable, and relay controls for locking the unused auxiliary system out of operation.

Fig. 2 shows a modification of the system of Fig. 1B in which the repeaters 11 of the main cable 10 are adapted to be alternatively energized by direct current power from one of two auxiliary stations, C and D, through operation of the relay circuit R' which is adapted to connect the first energized one of the pair to the main cable through the junction J, and lock the other out of operation. Other parts of the system, namely, the terminal stations A and B, the cable 10 and intervening repeaters 11, are as described with reference to Fig. 1.

As hereinbefore described with reference to Fig. 1B, the auxiliary stations of Fig. 2 may each have both positive and negative sources of potential 121, 122, at station C, and 221, 222, at station D, which may be alternatively connected to the respective auxiliary cables 124 for C and 224 for D through the respective switches 123 and 223, which are similar to the switch 23 of Fig. 1B.

The auxiliary cable 124 from station C is connected to the energizing windings of the neutral relay 125, which is equipped with the left-hand make-before-break contacts 125*a* and 125*b*, and the right-hand break contact 125*d*. Similarly, the auxiliary cable 224 from station D is connected to the energizing windings of the neutral relay 225, which is equipped with the right-hand make-before-break contacts 225*a* and 225*b*, and the left-hand break contact 225*d*. When the relays 125 and 225 are both deenergized, the ground 112 is connected to the windings of relay 125 through its break contacts 125*d* and 125*b*; and to the windings of the relay 225 through its break contact 225*d* and 225*b*.

Assume that a direct current positive potential is applied to the cable 124 at the auxiliary station C, which, if corresponding negative potentials are applied at the terminal stations A and B, is sufficient to supply a current of, for example, 100 milliamperes in the main cable 10. No potential is applied at station D.

The relay 125 is energized by current flowing through its windings to ground 112 by way of the break contact 225d of the relay 225. The relay 125 then operates its break contact 125d releasing the ground contact 112 from the circuit of the relay 225, and thereby locking it out of operation in the event that a potential is applied at the station D. The relay 125 also operates the make-before-break combination 125a—125b, releasing the ground 112, and providing for current flow from the station C, through the energizing windings of relay 125 to the junction 28, and through the inductance 29 to the junction J with the main cable 10.

If the flow of current from the auxiliary station C is cut off for some reason, causing the relay 125 to become deenergized, and power is then applied from the station D, the relay 225 acts in a similar manner to that described above to lock the auxiliary source C out of operation, and connect the source D to the main cable through the inductance 29. The inductance 29 and the condenser 27 are similar in function and structure to those same numeraled elements described with reference to Fig. 1B.

In the event that the auxiliary sources C and D are both disconnected, and it is desired to energize the cable 10 solely from its terminals by applied potentials of the same polarity, a ground similar to the ground 12 of Fig. 1B can be provided which is adapted to be disconnected by operation of either of the relays 125 or 225.

Figure 3:
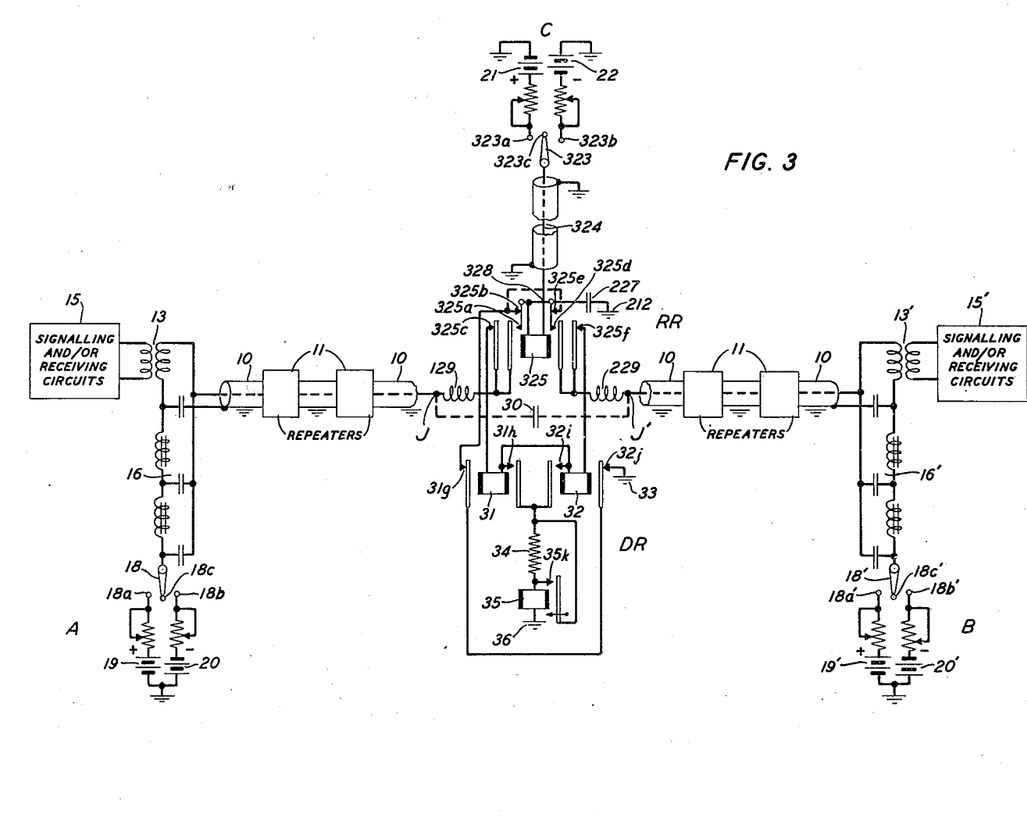
Fig. 3 shows a submarine cable system similar to that of Fig. 1B in which additional relay controls connected at the junction between main and auxiliary cables provide for the grounding of the direct current path of the main cable in response to applied voltages of opposite polarity from the two terminal stations, and the retention of such ground as long as the cable is energized from at least one terminal.

Fig. 3 shows a further modification of the circuit of Fig. 1B which includes, in addition to the relay circuit R which is responsive to connect the auxiliary source C to energize the repeaters 11, a delayed action relay circuit DR which is responsive to direct current potentials of opposite polarity from the terminals A and B to ground the main cable only when it is energized solely from the terminals.

The terminal stations A and B, the main cable 10, the intervening repeaters 11, the auxiliary station C, and the connecting cable 324 are substantially the same as described with reference to the previous figures.

The relay 325 is a conventional neutral relay, similar to the relay 25 described with reference to Fig. 1B, and is equipped with the left-hand make-before-break contacts 325a and 325b, the right-hand make-before-break contacts 325e and 325d, the outer left-hand break contact 325c and the outer right-hand break contact 325f. As shown in the drawing of Fig. 3, the switch 323 is on the contact 323c, so that no power flows in the auxiliary cable 324, and the relay 325 is deenergized, the aforesaid contact assuming their normal or unoperated positions.

If the switch 323 is positioned so that direct current power of a certain polarity is supplied from station C over the cable 324, and power of the opposite polarity thereto is supplied from the terminal stations A and B, the relay 325 operates its make-before-break contacts 325a and 325d so that power flows in both directions from the windings of the relay 325 through the respective inductors 129 and 229 to the western and eastern halves of the cable 10. As explained hereinbefore, if the relay circuit R is positioned at a repeater, the inductors 129 and 229 are substantially reduced in value, and the condenser 227 may be omitted altogether. In such case, the condenser 30 may also be omitted. As long as power is supplied from the station C, the break contacts 325c and 325f remain operated, so that the respective relays 31 and 32 are not energized.

When power ceases to flow from the auxiliary station C, the relay 325 deenergizes, releasing its contacts to their normal positions, whereby the make-contacts 325a and 325d are released, thereby disconnecting the main and auxiliary cables, prior to which operation the break contacts 325a and 325e and 325c and 325f are reengaged, so that the relays 31 and 32 are conditioned to operate solely in response to potential applied at the terminal stations A and B.

In order to operate the delayed action relay circuit DR to provide a contact to ground at the junction 328 with the main cable, equal and opposite potentials are applied at the stations A and B. Preferably, small potentials are first applied to opposite cable terminals, and increased gradually and simultaneously in the manner described in my Patent 2,020,316 so that the potential-to-ground at the junction 28 is kept small.

Assuming direct current voltage of a positive polarity to be applied at station A, and of a negative polarity at station B, current then flows from the western section of the main cable 10 through the inductance 129, contact 325c of the relay 325, through the energizing circuit of the relay 31, and the energizing circuit of the relay 32, from which it flows into the eastern section of the main cable 10 through the contact 325f of the relay 325, and the inductance 229.

The relays 31 and 32 are conventional neutral relays designed to operate in response to considerably less current than normally carried by the cable 10. The relay 31 is equipped with the left-hand break contact 31g and the right-hand make contact 31h; while the relay 32 is similarly equipped with the right-hand break contact 33j and the left-hand make contact 33i.

When the current flow in the circuit becomes sufficient, the relays 31 and 32 operate disengaging their respective break contacts 31g and 32a, breaking the circuit to ground 33 in two places, and eliminating the possibility of power flow from the auxiliary station C. Simultaneously, the make contacts 31h and 32i are engaged, whereby current may flow through the windings of the relays 31 and 32 respectively, the resistance 34, and the windings of the relay 35 to ground 36, if the potentials of the respective junctions J or J' are above or below ground potential. The relay 35 is a conventional slow-acting, non-polarized type, which is equipped with a copper yoke, and designed to operate in response to a predetermined current strength passing through the windings for a predetermined time interval. As soon as current is built up sufficiently to operate relays 31 and 32, the applied potential at station A, for example, would be removed. Then current from station B would flow through the windings of relay 35, which operates to engage its make-contact 35k thereby shunting out the resistance 34 which functions initially to minimize ground surges which might occur in case the main cable is not at ground potential when the relays 31 and 32 operate. An inductance may also be included in the ground circuit if desired, but should not be arranged to be short-circuited unless considerable resistance is included with it. The provision of means for reducing surge currents is important, since a sudden failure of the power supply from the auxiliary source C, with consequent release of the relay 25, might result in a surge from one part of the main cable to the other through the relays 31 and 32, thereby establishing ground connection 36 while the cable is at an elevated potential.

After the relays 31 and 32 have operated and the potential applied at the station which reversed its normal polarity for the foregoing operation has been removed, it is built up again with the opposite polarity for the purpose of operating the repeaters 11 for signal transmission. As long as one of the respective relays 31 or 32 remains operated by applied potential from either of the terminal stations A or B, the ground 36 remains connected to the main cable. The other relay, when again operated, closes a parallel connection to ground 36.

Figure 4:
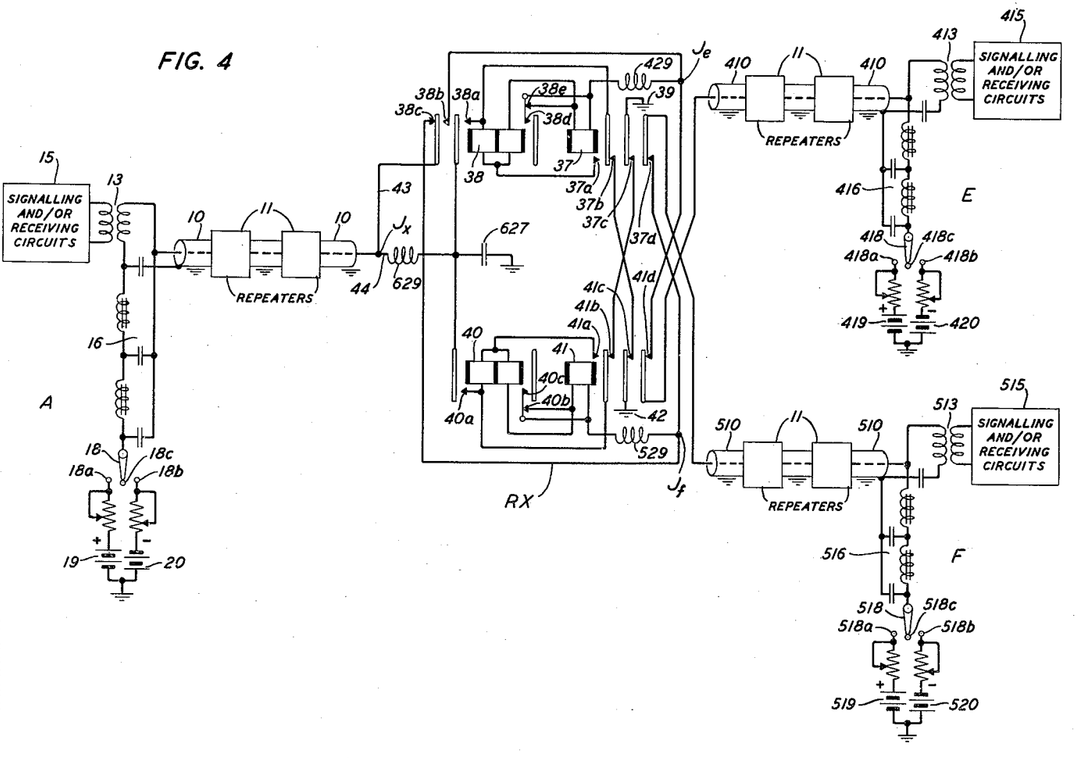
Fig. 4 shows a submarine cable system in which relay controls at a junction intermediate of the terminals provide for connection to the main cable of both the signaling and direct current circuits of the energized one of a pair of alternative cable sections.

Fig. 4 of the drawing shows a submarine cable system similar to those previously described in which a relay system RX, disposed at a junction in the main cable 10 is adapted to connect thereto whichever of the cables 410 or 510 from the respective terminal stations E and F is first energized, and to lock the unused cable out of operation.

The energizing and signaling circuits of terminal stations A are substantially as described with reference to the drawings hereinbefore. The alternative terminal stations E and F include both signaling and repeater energizing circuits which have been given designations, in the four-houndreds for circuit elements associated with station E, and in the five-hundreds for circuit elements associated with station F, which correspond to the tens designations assigned to similar circuit elements hereinbefore described with reference to stations A and B. Thus, signaling circuits 415 and 515 may be assumed similar in function and construction to the signaling circuit 15, hereinbefore described, etc.

As in the cases of the previously described relay junctions, the junction $J_x$ may either be located between repeaters on the main cable, as shown in Fig. 4, or it may be located at a repeater, in which case the leads 43 and 44, instead of being connected together as shown, are respectively connected to the repeater output circuit and the repeater heater circuit. As stated with reference to previously described circuits, the inductance 629, which serves to minimize surge currents from the main cable to ground, may be substantially reduced in value if the junction $J_x$ is located at a repeater; and the condenser 627 may be omitted altogether in such case. At the respective junctions $J_e$ and $J_f$ the inductances 429 and 529 function in a similar manner to the inductance 629 to keep the alternating current telegraph and speech signals from being shunted by the relay circuits.

The relay system RX comprises the non-polar relays 37, 38, 40 and 41. In order to reduce the voltage break-down requirements on the contacts of relays 38 and 40, the system is preferably designed so that when cable 410 is energized, relays 40 and 41 are isolated therefrom and from ground; and conversely, when cable 510 is energized, relays 37 and 38 are isolated therefrom and from ground. The relays 37 and 41 are therefore designed to withstand high voltage across their open contacts in the operated condition, thus permitting relays 38 and 40 to be designed to operate at a low enough voltage to avoid condition which would result in severe current surges when connections to the main cable are made. The relay 38, which is designed so that a considerable part of its windings are shunted out after initial operation, is equipped with the left-hand break contact 38c, outer and inner left-hand make contacts 38b and 38a, and right-hand make-before-break contacts 38d and 38e. The relay 40, which is in general similar to the relay 38, is equipped with the left-hand make contact 40a, and right-hand make-before-break contacts 40b and 40c. The relay 37, which is normally shunted out by the contacts of relay 38, is equipped with the right-hand make contact 37a, and the break contacts 37b, 37c and 37d; similarly, relay 41 is equipped with right-hand make contact 41a, and break contacts 41b, 41c, and 41d. The relays as shown in Fig. 4 of the drawings assume their normal or unoperated positions.

If it is desired to connect branch cable 410 to the main cable 10, assuming none of the cables is energized, the relay circuit RX operates in the following manner. Low voltages of opposite polarity are applied at the shore terminals A and E in the manner previously described. Current then flows through the inductance 429 to the energizing circuit of the relay 38 through the break contact 38e which normally short-circuits the relay 37, and from the windings thereof to ground 42 through the break contact 37b under control of the relay 37 and the break contact 41c under control of the relay 41.

The relay 38 is then energized to perform the following operations.

The make contact 38a is actuated to connect the grounded end of the windings of relay 38 to the junction $J_x$ through the inductance 629.

The make contact 38b is engaged, whereby the cable 410 is connected to the main cable 10 at the junction $J_x$.

The two foregoing operations respectively connect the energizing and signaling circuits of the branch cable 410 to the main cable 10, and maintain such connection as long as the cable 410 is energized.

After the above-described operations are complete, the break contact 38e is actuated, thereby releasing the shunt across the relay 37, and causing it to become energized, to perform the following operations. The break contact 37b operates to release ground 42 from the windings of the relay 38, and the make contact 37a is subsequently engaged, whereby the part of the windings unnecessary to maintain the relay in operation is shunted out.

Simultaneously, the break contact 37c is operated to disconnect the circuit of relay 40 from ground 39; and the break contact 37d is operated. The aforesaid operations isolate relays 40 and 41 from ground and from the cable 510, in order to reduce voltage break-down requirements, as pointed out hereinbefore. The relays 40 and 41, which are responsive to energy from the cable 510, are thus locked out of operation for as long a period as power is supplied through branch cable 410.

If it is desired to use the branch cable 510 instead of the cable 410 as described, a low voltage is applied at station F. Operation of the relays 40 and 41 is similar to the above-described operation of relays 37 and 38, excepting that the junction $J_f$ with the cable 510 is normally connected to the junction $J_x$ of the main cable 10 through the break contact 38c of the deenergized relay 38. Correspondingly, relays 37 and 38 are locked out of operation.

It will be apparent from a study of the above circuits that the principles of this invention can be applied to the design of circuits which would allow any one of more than two cables to be brought into service as terminal or current supply cables. In fact, many modifications of the circuits shown which are within the scope of this invention will be apparent to those skilled in the art.

What is claimed is:

1. An electrical transmission system comprising in combination a main cable for signal transmission having repeaters distributed in tandem relationship along said cable, sources of power connected to the terminals of said main cable, said repeaters comprising energizing circuits which include sections of said main cable connected to said sources of power, an auxiliary power source having an auxiliary cable connected thereto, a junction intermediate of the terminals of said main cable, a first relay means connected to said junction and operative in response to current from said auxiliary power source, to connect said auxiliary cable with said main cable in circuit relationship with the energizing circuits of said repeaters, a ground contact at said junction, and a second relay means connected to said junction and operative in response to power supplies of opposite polarity at the terminals of said main cable, to connect said main cable to said ground contact.

2. A system in accordance with claim 1 in which said second relay remains operative retaining the connection between said main cable and said ground contact as long as said main cable is energized from at least one terminal.

3. An electrical transmission system comprising a main cable for signal transmission having repeaters distributed in tandem relationship along said cable, sources of power connected to each of the terminals of said main cable, the energizing circuits of said repeaters being connected to said sources of power through sections of said main cable, alternative sources of auxiliary power, auxiliary cables respectively connected to said alternative sources, a junction intermediate of the terminals of said main cable, relay means connected to said junction, said relay means including circuit elements constructed and arranged to connect the first energized of said auxiliary cables to said main cable in circuit relation with the energizing circuits of said repeaters and said respective terminal sources of power, said relay means including circuit elements constructed and arranged to simultaneously lock the unused auxiliary cable out of operation.

4. An electrical transmission line system having repeaters disposed in tandem relationship along a main cable for signal transmission, a source of power connected to one terminal of said main cable, the energizing circuits of said repeaters connected to said source through sections of said main cable, a junction remote from the terminal of said main cable, alternative branch cables, a terminal source of energizing current connected to each said branch cable, relay means disposed at said junction, said relay means connected to operate in response to the energizing current in at least one said branch cable to connect said cable to the main cable at said junction, in circuit relationship with the energizing circuits of said repeaters and said terminal source.

5. A system in accordance with claim 4 in which said relay means includes circuit means to lock the unenergized ones of said alternative branch cables out of operation.

6. An electrical transmission system comprising a main cable for signal transmission having two main terminals, a plurality of signal repeaters connected in tandem relation along said main cable and having their respective energizing circuits connected through successive sections of said main cable, an auxiliary power source having an auxiliary cable connected thereto, a junction intermediate of the terminals of said main cable, relay means connected to said junction, said relay means connected to operate in response to the energizing current in said auxiliary cable to control the interconnection of said auxiliary cable and said main cable in circuit relationship with the energizing circuits of said repeaters.

7. An electrical transmission system comprising in combination a main cable for signal transmission having two main terminals including repeaters connected at intervals between said terminals, said repeaters having their respective energizing circuits connected through the successive sections of said main cable, a source of power for energizing said repeaters, and means for connecting said power source to said energizing circuits through said main cable at a point intermediate of said terminals, said means comprising an auxiliary cable connected to said source and a system of relays operative in response to current from said source.

8. An electrical transmission system comprising a main cable for signal transmission having two main terminals, a plurality of signal repeaters connected in tandem relationship along said main cable and having their respective energizing circuits connected through successive sections of said main cable, and an auxiliary power source having an auxiliary cable connected thereto, means comprising a system of relays for connecting said main cable to said auxiliary cable at a point intermediate of said main terminals to energize said repeaters.

9. A submarine cable signaling system which comprises in comination at least three cable sections having a common undersea junction, certain of said cable sections including signal repeaters connected in tandem relationship, the energizing circuits of said signal repeaters connected through one of said certain cable sections including signal repeaters, at least three corresponding sources of power substantially remote from said junction for energizing said repeaters, each of said cable sections connected to receive power current from a respective one of said sources, and means to control the connection of one of said cable sections with another of said cable sections for the transmission of power current to energize said repeaters, said means including an electromagnetic relay disposed at said junction, and having an operating circuit connected to be energized by the power current from one of said last-named cable sections.

10. A submarine cable signaling system in accordance with claim 9 which includes at least three signal translating circuits, and in which each of said cable sections is connected to receive signal currents from a respective one of said sources.

11. A submarine cable signaling system in accordance with claim 9 in which two of said cable sections are continuously connected at said junction to provide a permanent system for the transmission of signal currents, and a third of said cable sections is connected upon operation of said relay to the aforesaid cable sections at said junction exclusively for the transmission of power current thereto.

12. A submarine cable signaling system in accordance with claim 11 which includes a connection to ground at said junction, and in which the deenergization of said relay operates to apply said ground connection at said junction to the power transmission circuit of said two connected signal-transmitting cable sections.

13. A submarine cable signaling system in accordance with claim 12 which includes additional relay means disposed at said junction and operated by currents of different polarities simultaneously applied at the terminals of said connected signal-transmitting cable sections to apply said ground connection at said junction to the power transmission circuit thereof.

14. A submarine cable signaling system in accordance with claim 13 in which the relay means to apply said ground connection at said junction of said connected signal-transmitting sections is maintained in operation by power current from either one of said terminals.

15. A submarine cable signaling system in accordance with claim 9 in which said power current for energizing said repeaters is direct current.

16. A submarine cable signaling system in accordance with claim 9 in which said means including an electromagnetic relay to control the connection of one of said cable sections with another of said cable sections at said junction includes circuit means to lock an unused cable section out of operation.

17. A submarine cable signaling system which comprises in combination at least three cable sections having a common undersea junction, certain of said cable sections including signal repeaters connected in tandem relationship therealong and having their energizing circuits connected in series through a section of said cable including said signal repeaters, at least three corresponding sources of power substantially removed from said junction for energizing said repeaters, at least three corresponding signal translating circuits substantially removed from said junction, each of said cable sections connected to receive power current from a respective one of said power sources and to receive signal currents from a respective one of said signal translating circuits, and means to control the connection of one of said cable sections with another of said cable sections for the transmission of power current to energize said repeaters and for the transmission of signal currents, said means including an electromagnetic relay disposed at said junction and having an operating circuit connected to be energized by the power current from one of said last-named cable sections.

OLIVER B. JACOBS.

REFERENCES CITED

The following references are of record in the file of this patent:

UNITED STATES PATENTS

| Number | Name | Date |
| --- | --- | --- |
| 2,020,297 | Buckley et al. | Nov. 12, 1935 |
| 2,020,316 | Jacobs | Nov. 12, 1935 |
| 2,079,689 | Gorton | May 11, 1937 |
| 2,263,320 | Trucksess | Nov. 18, 1941 |
| 2,288,487 | Rosen | June 30, 1942 |
| 2,329,010 | Spencer | Sept. 7, 1943 |